US006768625B2

(12) United States Patent
Tokuhara

(10) Patent No.: US 6,768,625 B2
(45) Date of Patent: Jul. 27, 2004

(54) CONNECTORS

(76) Inventor: Tsunemi Tokuhara, 3-19-6, Sakaechoh, Kodaira-shi, Tokyo (JP)

(*) Notice: Subject to any disclaimer, the term of this patent is extended or adjusted under 35 U.S.C. 154(b) by 148 days.

(21) Appl. No.: 10/151,972

(22) Filed: May 22, 2002

(65) Prior Publication Data

US 2003/0220017 A1 Nov. 27, 2003

(51) Int. Cl.[7] .................................................. H02H 1/00
(52) U.S. Cl. ........................ 361/119; 439/608; 333/254
(58) Field of Search ................................. 361/111, 119, 361/816, 818; 174/35 C; 439/89, 607, 608, 283; 333/12, 32–34, 248, 254–257

(56) References Cited

U.S. PATENT DOCUMENTS 3,809,908 A * 5/1974 Clanton ...................... 250/551
4,033,654 A * 7/1977 Ross .......................... 439/609
4,623,858 A * 11/1986 Montesanto et al. ........ 333/255
4,675,633 A * 6/1987 Young ........................ 333/257
4,815,986 A * 3/1989 Dholoo ....................... 439/248
5,291,829 A * 3/1994 Avory et al. ............. 102/202.2
5,317,469 A * 5/1994 Lu ............................. 361/40
5,395,267 A * 3/1995 Tregoning .................. 439/607
6,573,803 B1 * 6/2003 Ziegner et al. ............... 333/26
6,590,395 B2 * 7/2003 Reykowski et al. ........ 324/322
6,653,557 B2 * 11/2003 Wolf et al. ............... 174/35 R

FOREIGN PATENT DOCUMENTS

JP P2002-203730 A * 7/2002 .......... H01F/38/14

* cited by examiner

*Primary Examiner*—Ronald Leja
(74) *Attorney, Agent, or Firm*—Wenderoth, Lind & Ponack, L.L.P.

(57) ABSTRACT

A connector is provided that eliminates a conductive portion and is free from mechanical contact at its coupling portion. A pair of holders is provided with an interface unit and cables extending outwardly are connected to one part of the interface unit, and radio wave-electric signal mutual converting elements built in the holders are connected to the other part of the interface unit. The pair of holders is allowed to be coupled in proximity by means of a coupling mechanism made from a flexible electromagnetic field shielding material, and a radio wave propagation space is formed at the coupling proximity portion of a pair of the holders which is shut out from the electromagnetic field of the outside. The radio wave-electric signal mutual converting elements of a pair of the holders conduct the reception and transmission of the radio wave mutually by being opposed in proximity by means of the radio wave propagation space.

14 Claims, 2 Drawing Sheets

CONNECTORS

BACKGROUND OF THE INVENTION

The present invention relates to connectors for use in coupling a variety of electrical equipment and devices.

Conventional connectors are of general construction wherein cables to be connected to a variety of electrical equipment and devices are coupled by a contact of a conductor.

The conventional connectors having a conductive part to be energized by a contact of a conductor tend to cause an oxidation and wear and tear at its coupling portion, and moreover, are not strong enough against vibration.

An object of the present invention is to solve the foregoing problems.

SUMMARY OF THE INVENTION

The present invention provides a connector that eliminates a conductive portion to be energized by a mechanical contact at the coupling portion, has strong resistance to abrasion or vibration, and is superior in durability.

The present invention is constructed in such a way that each of a pair of holders is provided with an interface. A cable extending externally is connected to one part of this interface, and a radio wave-electric signal mutually converting element built in the holder is connected to the other part of the interface. The pair of holders is constructed in such a way that the holders can couple with each other by approaching one another by means of a coupling means made from an electromagnetic field shielding material of a flexible type. A radio wave propagation space is formed at a coupling approaching portion of the pair of holders which is shut out from an electromagnetic field of the outside. The radio wave-electric signal mutual converting elements of the pair of holders, which perform reception and transmission of the radio wave, are opposed to each other by means of the radio wave propagation space.

DESCRIPTION OP DRAWINGS

DETAILED DESCRIPTION OF THE INVENTION

The present invention will be described in detail in the following description by referring to the attached drawings showing an embodiment of the present invention.

Figure 1:
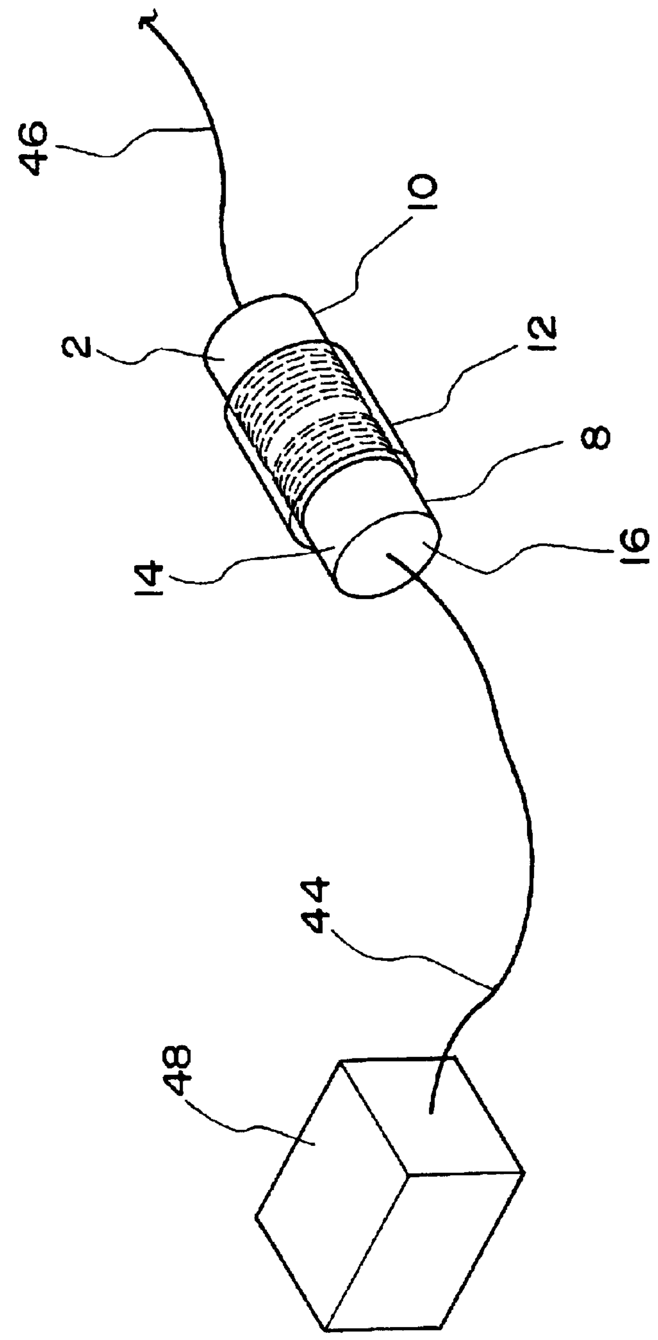
FIG. 1 shows an explanatory drawing of a connector according to the present invention.
Figure 2:
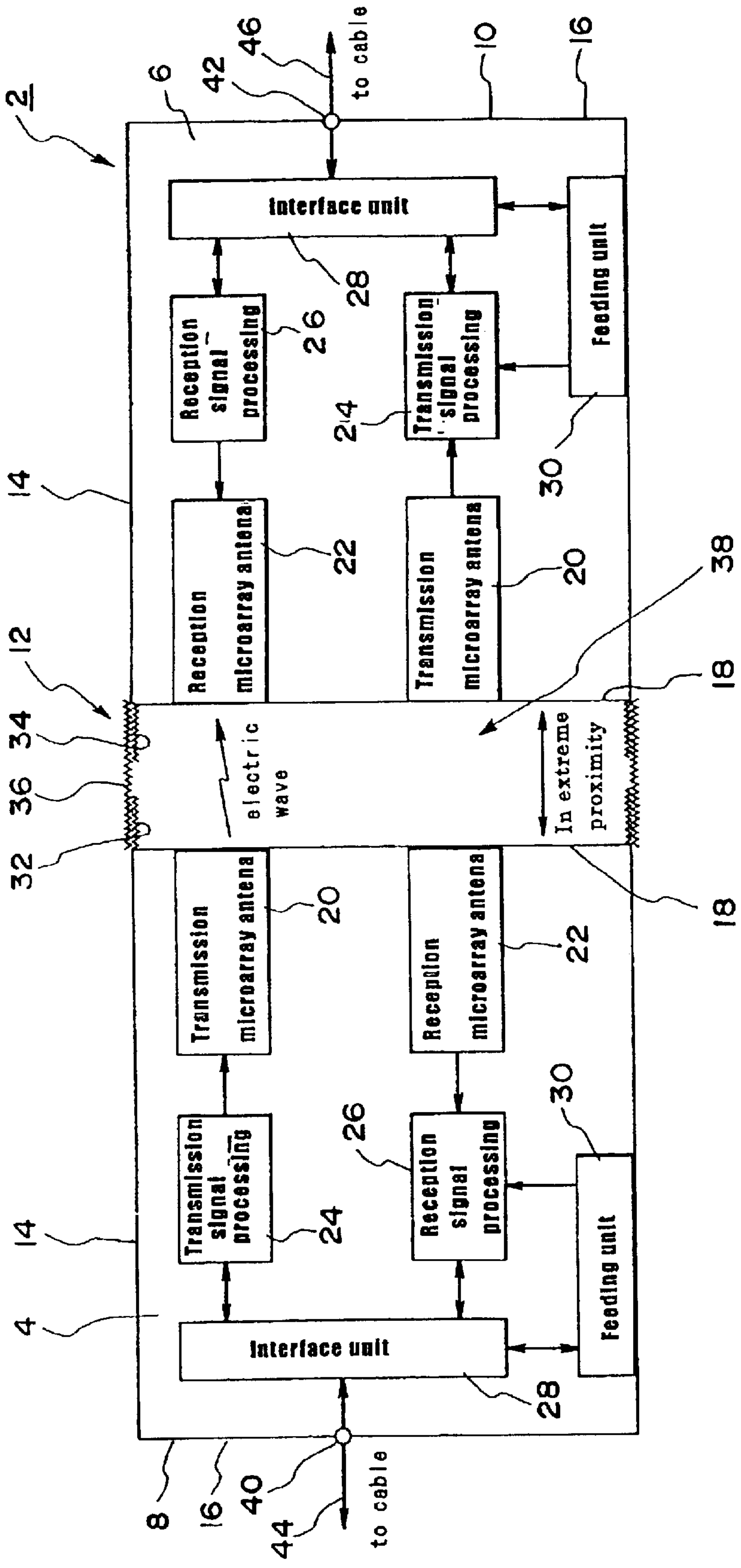
FIG. 2 shows a schematic drawing of a connector according to the present invention.

Numeral (2) denotes a connector that comprises a pair of holders (8) (10) of cylindrical shape in which radio wave-electric signal mutual converting elements (4) (6) are built in, and a coupling means (12) made of electromagnetic field shielding material that detachably couples the pair of the holders (8) (10). The holders (8) (10) comprise a peripheral wall portion (14) made from the electromagnetic field shielding material and side wall portions (16) (18). The interior of the holders is shut out from the electromagnetic field of the outside. In the interior of the holders (8) (10), a transmission microarray antenna (20), a reception microarray antenna (22), a transmission signal processing unit (24), a reception signal processing unit (26), an interface unit (28), and a feeding unit (30) are built in by means of support fixtures made from an insulating material. These units are made in chip form and are wired as shown in FIG. 2 so as to form radio wave-electric signal mutual converting elements (4) (6). On the side wall portions (18) (18) of the holders (8) (10) which are mutually and closely located, windows are formed, and on the windows, the transmission microarray antenna (20) and the reception microarray antenna (22) are disposed. Rings (32) (34) made from electromagnetic field shielding material such as flexible conductive plastics and the like are fixed to each terminal of the holders (8) (10). Numeral (36) denotes a tubular coupling cap, and is made from electromagnetic field shielding material such as flexible conductive plastics and the like. The coupling cap (36) can be pressed onto an external peripheral surface of the ring (32) or (34) with its one inner peripheral surface, and furthermore, the external peripheral surface of the ring (32) or (34) is arranged to be pressed onto the other external peripheral surface of the cap (36). The rings (32) (34) and the coupling cap (36) constitute the coupling means (12) for proximity coupling of the holders (8) (10) in a detachable manner. In order to couple the holders (8) and (10), one of the peripheral surfaces of the coupling cap (36) is pressed into the ring (32), and then, the ring (34) is pressed into the other peripheral surface of the cap (36). On the rings (32) (34) of the coupling cap (36), screw type concave and convex portions are formed so that they rarely become disengaged when the fitting is carried out. When the holders (8) (10) are coupled with the coupling cap (36), an extremely thin disk-like closed radio wave propagation space (38) is formed which is surrounded by the side wall portions (18) (18) of the holders (8) (10). When the holders (8) (10) are coupled, the transmission and reception microarray antennas (20) (22) at the side of the holder (8) are opposed to the transmission and reception microarray antennas (20) (22) at the side of the holder (10) with a small distance therebetween. On the side wall portions (16) (16) of each holder (8) (10), terminals (40) (42) connected to the interface unit (28) are mounted, and the terminals (40) (42) are connected to an input/output unit of an electrical equipment (48) to be coupled by means of the cables (44) (46).

In the foregoing construction, the electric signal of the electrical equipment (48) inputted to the interface unit (28) in the holder (8) through the cable (44) is processed by the transmission signal processing unit (24), and the signal is transmitted as microwave or milliwave from the transmission microarray antenna (20). The radio wave transmitted from the transmission microarray antenna (20) is received at the reception microarray antenna (22) in the opposed holder (10), is processed in the reception signal processing unit (26) connected to the antenna, and is transmitted to the electrical equipment connected to the cable (46) from the interface unit (28). The processing units (24) (26) conduct a multipath fading processing of the radio wave, conduct error processing, format conversion, channel extraction filtering and the like.

The present invention has no conductive portion at the coupling portion of the connector, which makes the contact as explained above, so that oxidation and wear and tear of the coupling portion can be prevented. Furthermore, the connector can be used almost permanently as it is strong against vibration of the coupling portion. Still furthermore, as the coupling portion is shielded from a radio wave of the outside, it is strong against noise and yet it consumes only a low level of electric power.

What is claimed is:

1. A connector for coupling a pair of cables to permit transmission and reception of a signal traveling between electrical equipment, said connector comprising:

a first holder;

a second holder; and a coupling mechanism operable to couple the first holder to the second holder, wherein, when the first and second holders are coupled by the coupling mechanism, a space is formed between the first holder and the second holder such that the signal traveling between electrical equipment is able to propagate through the space between the first holder and the second holder in the form of a radio wave.

2. A connector according to claim 1, further comprising:

a first transmission antenna disposed in the first holder;

a first reception antenna disposed in the first holder;

a second transmission antenna disposed in the second holder; and a second reception antenna disposed in the second holder.

3. A connector according to claim 2, wherein the first transmission antenna and the second reception antenna are disposed so as to oppose one another across the space formed between the first holder and the second holder, and wherein the first reception antenna and the second transmission antenna are disposed so as to oppose one another across the space formed between the first holder and the second holder.

4. A connector according to claim 2, wherein the first holder comprises a first side wall portion on which the first transmission antenna and the first reception antenna are disposed, and wherein the second holder comprises a second side wall portion on which the second transmission antenna and the second reception antenna are disposed.

5. A connector according to claim 4, wherein the space between the first holder and the second holder is formed by the coupling mechanism, the first side wall portion of the first holder, and the second side wall portion of the second holder.

6. A connector according to claim 1, wherein the coupling mechanism comprises:

a first ring coupled to the first holder;

a second ring coupled to the second holder; and a coupling cap coupled to the first ring and the second ring.

7. A connector according to claim 1, further comprising:

a first interface unit disposed in the first holder; and a second interface unit disposed in the second holder.

8. A connector according to claim 7, further comprising:

a first transmission signal processing unit disposed in the first holder and coupled to the first interface unit;

a first reception signal processing unit disposed in the first holder and coupled to the first interface unit;

a second transmission signal processing unit disposed in the second holder and coupled to the second interface unit; and a second reception signal processing unit disposed in the second holder and coupled to the second interface unit.

9. A connector according to claim 8, wherein the first and the second transmission signal processing units and the first and the second reception signal processing units are capable of conducting error processing.

10. A connector according to claim 1, wherein at least one of said first holder and said second holder is formed in the shape of a cylinder.

11. A connector according to claim 1, wherein the coupling mechanism detachably couples the first holder to the second holder.

12. A connector according claim 1, wherein the coupling mechanism is formed from a flexible electromagnetic field shielding material.

13. A connector according to claim 1, wherein the first holder and the second holder are formed rom a fexible electromagnetic field shielding material.

14. A connector according to claim 1, wherein the coupling mechanism is adapted to prevent an external electromagnetic field from entering the space formed between the first holder and the second holder.

* * * * *